US006826981B1

United States Patent
Kress

(10) Patent No.: US 6,826,981 B1
(45) Date of Patent: Dec. 7, 2004

(54) DIFFERENTIAL FOR RACING CARS

(75) Inventor: Robert A. Kress, Royal Oak, MI (US)

(73) Assignee: Tractech Inc., Madison Heights, MI (US)

( * ) Notice: Subject to any disclaimer, the term of this patent is extended or adjusted under 35 U.S.C. 154(b) by 0 days.

(21) Appl. No.: 10/640,050

(22) Filed: Aug. 14, 2003

(51) Int. Cl.[7] .............................................. F16H 48/12
(52) U.S. Cl. ..................... 74/650; 475/233; 475/159; 192/50; 192/48.92
(58) Field of Search ............................ 74/650; 192/50, 192/48.92; 475/159, 233

(56) References Cited

U.S. PATENT DOCUMENTS

| 2,638,794 A | | 5/1953 | Knoblock | |
|---|---|---|---|---|
| 3,397,593 A | | 8/1968 | Knoblock | |
| 3,791,238 A | | 2/1974 | Bokovoy | |
| 4,424,725 A | * | 1/1984 | Bawks | 74/650 |
| 4,524,640 A | * | 6/1985 | Neumann et al. | 74/650 |
| 4,557,158 A | | 12/1985 | Dissett | |
| 5,524,509 A | * | 6/1996 | Dissett | 74/650 |
| 5,590,572 A | * | 1/1997 | Valente | 74/650 |
| 6,076,429 A | * | 6/2000 | Valente | 74/650 |

* cited by examiner

Primary Examiner—Charles A. Marmor
Assistant Examiner—David D. Le
(74) Attorney, Agent, or Firm—Lawrence E. Laubscher, Sr.

(57) ABSTRACT

A differential for racing cars that travel in a given direction around a closed circular or oval track, including an over-running clutch arrangement for disengaging from the drive train of the differential an outside wheel shaft that overruns the inside wheel shaft during a turn by a given amount, and a locking device for continuously locking the inside wheel shaft to the differential drive train. Preferably, the locking device comprises a locking gear that is non-rotatably splined to the inside wheel shaft and that has pinion teeth that are in continuous engagement with the central drive member of the differential.

9 Claims, 4 Drawing Sheets

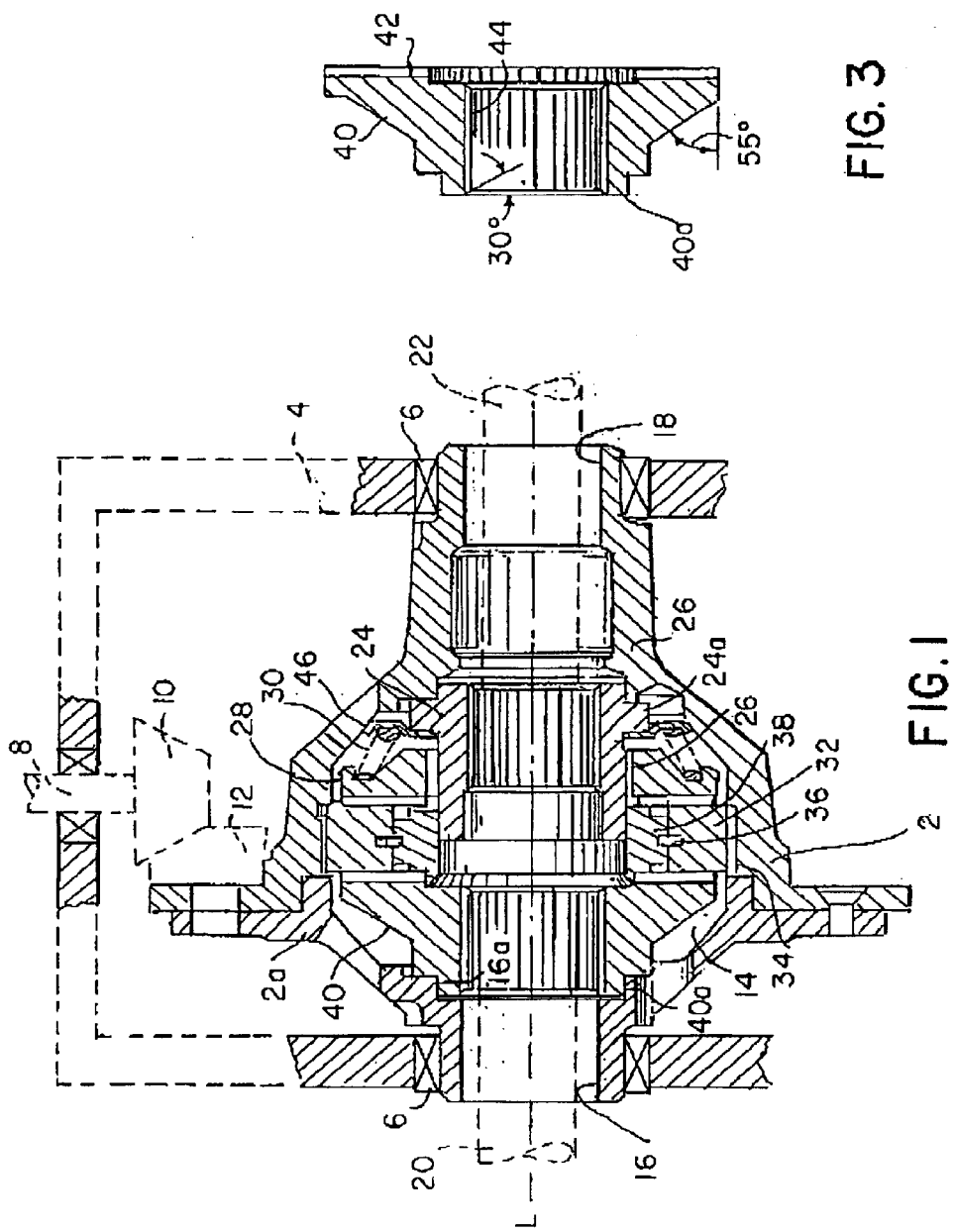

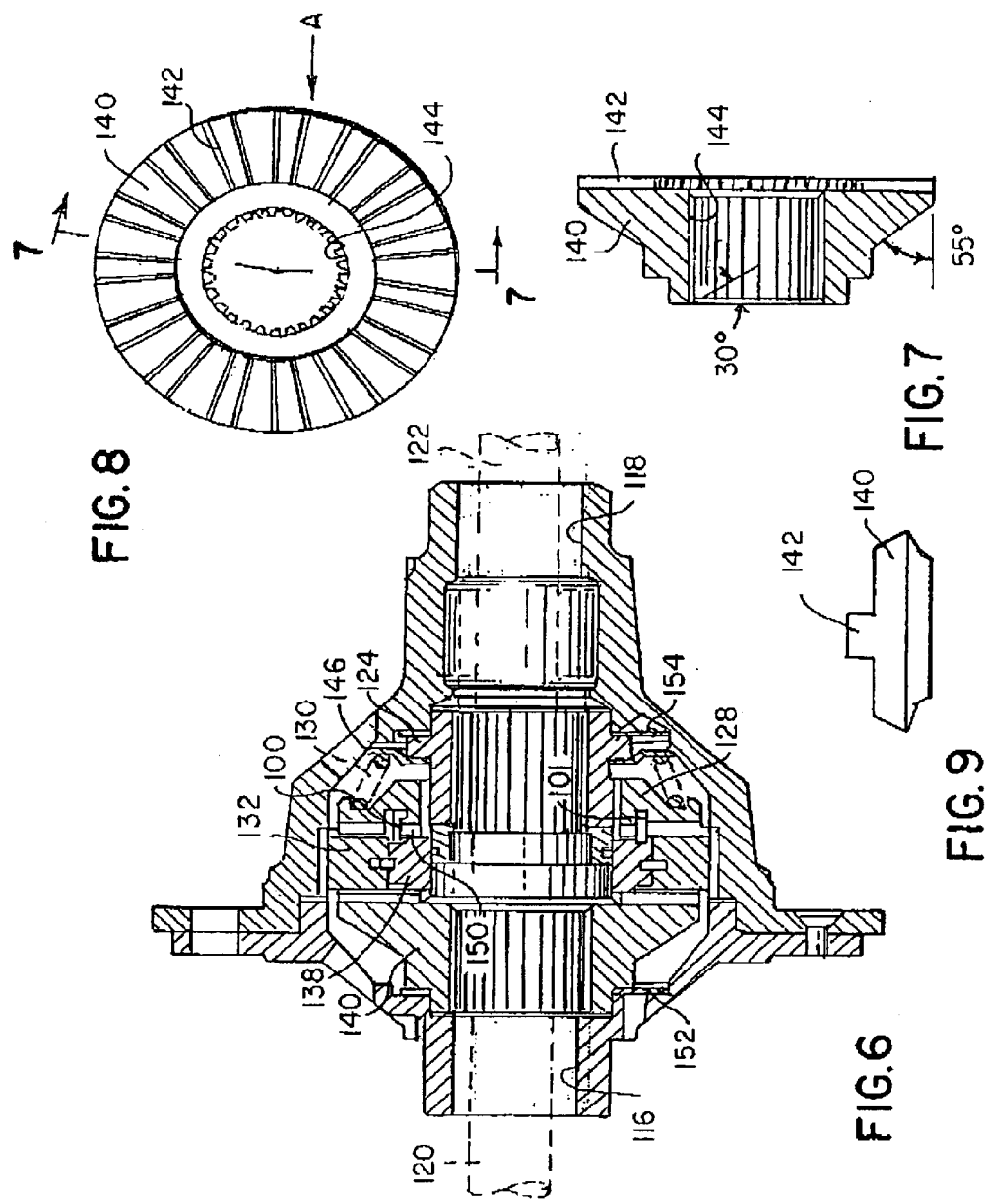

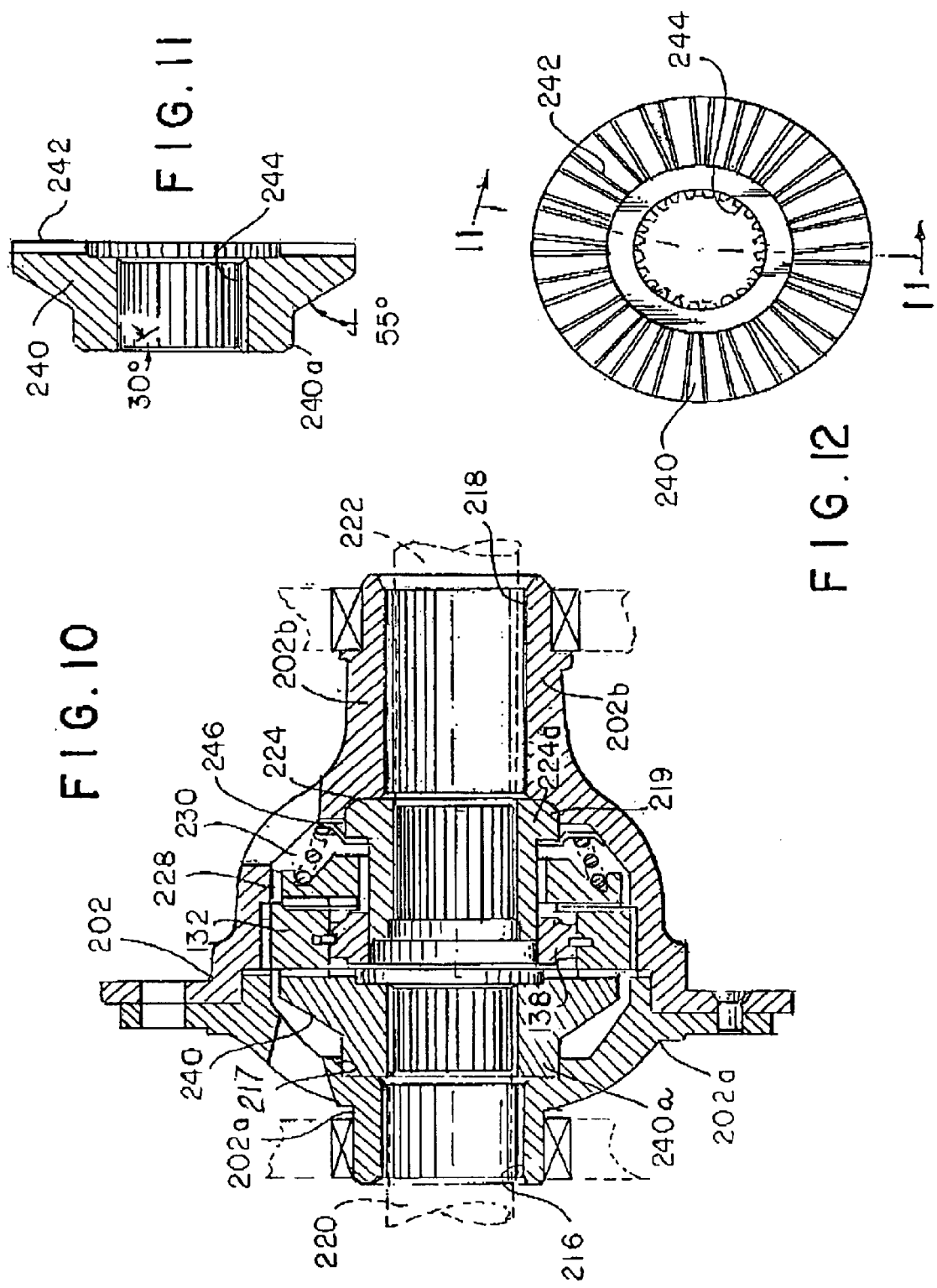

DIFFERENTIAL FOR RACING CARS

BACKGROUND OF THE INVENTION

1. Field of the Invention

A locking differential mechanism for racing cars that travel in a given direction around a circular or oval track is disclosed, including locking means for continuously locking the inside wheel shaft to the differential drive train, and normally-engaged overrunning clutch means that are operable during a turn to disengage the outside wheel shaft to a free-running condition when the velocity thereof exceeds that of the inside wheel shaft by a predetermined amount.

2. Brief Description of the Prior Art

As shown by the prior U.S. patents to Knoblock U.S. Pat. Nos. 2,638,794 and 3,397,593, Bokovoy U.S. Pat. No. 3,791,238 and Dissett et al U.S. Pat. No. 4,557,158, it is well known in the patented prior art to provide locking differential mechanisms for vehicles that are operable during a turn in either direction to disengage the overunning outside wheel shaft to a free-wheeling condition when the rotational velocity thereof exceeds the rotational velocity of the inside wheel shaft by a predetermined amount. Center cam means serve to axially displace the overrunning clutch gear away from the central drive member against the force of restoring clutch spring means as long as the overrunning condition exists. When the turn is completed and the velocity of the outside wheel shaft decreases to that of the inside wheel shaft, the clutch gear member is returned by the clutch spring means to its original driven condition in engagement with the central drive member. It is also known to provide holdout ring means for maintaining the outside wheel in the disengaged condition as long as the overrunning condition exists. This type of differential mechanism has utility in all types of on-road and off-road motor driven vehicles.

In the racing car industry, in many types of races, it is common for the racing cars to travel in only one given direction (generally, counterclockwise) along a closed circular or oval track, and consequently the same wheel is always the outside wheel. The present invention was developed to provide an improved locking differential for use with race cars that travel only in a given direction around a closed circular or oval track, which differential affords a rugged durable construction having a low maintenance cost.

SUMMARY OF THE INVENTION

Accordingly, a primary object of the present invention is to provide a differential mechanism for race cars that travel in one direction around a closed circular or oval track, including overrunning clutch means that effect disengagement from the drive train of the outer wheel shaft when the rotational velocity thereof exceeds that of the inside wheel shaft by a predetermined amount, and locking means for continuously connecting the inner wheel shaft with the drive train of the differential.

According to a more specific object of the invention, the inside wheel shaft locking means includes an annular locking gear that is non-rotatably splined to the end of the inside wheel shaft, said locking gear including pinion teeth that are in continuous driven engagement with corresponding pinion teeth on one end face of the central driver member that is splined with the differential housing. Pinion teeth on the other end of the center driver member are normally engaged by corresponding pinion teeth on an overrunning clutch member that is connected with the outside wheel shaft. Center cam means are provided for disengaging the clutch member from the center driver member upon the occurrence of an overrunning condition of the outside wheel shaft during a turn. Holdout ring means may be provided for maintaining the clutch member in the disengaged condition as long as the overrunning condition exists.

According to a more specific object of the invention, the pinion teeth on the center drive member, the overrunning clutch member, and the locking gear have a relatively shallow depth, and the remote ends of the side gear of the overrunning clutch means and the locking member are enlarged and extend within counterbores formed in the opposed output shaft openings contained in the end walls of the differential housing. In an embodiment of the invention including holdout ring means, the depth of the pinion teeth each of on the center driver member, the overrunning clutch member, and the locking gear is relatively great. Thrust washer means are provided at the remote ends of the side gear and the locking gear.

BRIEF DESCRIPTION OF THE DRAWINGS

Other objects and advantages of the invention will become apparent from a study of the following specification when viewed in the light of the accompanying drawings, in which:

FIG. 1 is a longitudinal sectional view of a first embodiment of the racing car differential of the present invention taken along line 1—1 of FIG. 2.

FIG. 3 is longitudinal sectional view of the locking gear component of FIG. 1, and FIGS. 4 and 5 are left hand and right hand end views, respectively, of the locking gear component of FIG. 3;

FIG. 6 is a longitudinal sectional view of a second embodiment of the racing car differential of the present invention;

FIG. 7 is a longitudinal sectional view of the locking gear of FIG. 6, taken along line 7—7 of FIG. 8, and FIG. 8 is a right hand end view of the locking gear of FIG. 7;

FIG. 9 is a detailed end view of a tooth of the locking gear, taken in the direction shown by the arrow A in FIG. 8;

FIG. 10 is a longitudinal sectional view of a third embodiment of the racing car differential of the present invention;

FIG. 11 is a longitudinal sectional view of the locking gear of FIG. 10 taken along line 11—11 of FIG. 12; and FIG. 12 is a right hand end view of the locking gear of FIG. 11.

DETAILED DESCRIPTION

Figure 4:
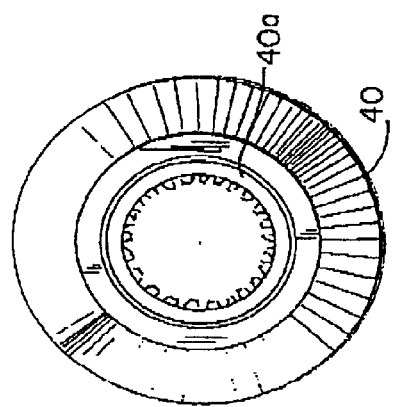

Referring fist more particularly to the embodiment of FIGS. 1–5, the racing car differential mechanism of the present invention includes a sectional housing 2 that is supported for rotation about its longitudinal axis L within the differential casing 4 by bearing means 6, as is known in the art. The housing is rotatably driven by the vehicle drive shaft 8 via pinion gear 10 and ring gear 12 that is bolted to the outer flange portion of the housing 2.

The housing 2 contains a chamber 14 having opposed end walls containing output shaft openings 16 and 18 for receiving the wheel shafts or axles of the racing car. In the illustrated embodiment of FIG. 1, it is assumed that the direction of travel of the racing car around a closed circular or oval track causes wheel shaft 20 to be the inside wheel shaft on a turn, and the wheel shaft 22 to be the outside wheel shaft. The outside wheel shaft 22 has a splined end extending within the chamber 14 that is non-rotatably connected with the internally splined annular side gear 24 that is supported within housing section 2b for rotation about the longitudinal axis L. Mounted for axial sliding displacement concentrically about the side gear 24 by spline means 26 is an annular-internally splined overrunning clutch member 28. The clutch member 28 is normally biased to the left by the helical compression clutch spring 30, thereby to cause driven pinion clutch teeth on the left hand face of the clutch member to engage corresponding drive pinion teeth on the right hand end of the annular central driver gear 32. The central driver gear 32 is arranged concentrically about the housing rotational axis L and is non-rotatably connected with the housing section 2b by spline means 34. Arranged concentrically within the central driver gear 32 and rotatably connected by resilient clip 36 is an annular cam member 38 the right hand end of which is provided with cam teeth that engage corresponding cam teeth on the left hand end of the clutch member 28, as is known in the art.

In accordance with a characterizing feature of the present invention, the central driver gear 32 is provided on its left hand end face with driver pinion teeth that are in continuous engagement with corresponding driver teeth on an annular locking gear 40, that is mounted for rotation within the housing 2 concentrically about the longitudinal axis L thereof. The locking gear 40 is internally splined for non-rotational connection with the splined end of the inside wheel shaft 20 that extends within the chamber 14 via the first output shaft opening 16.

Figure 5:
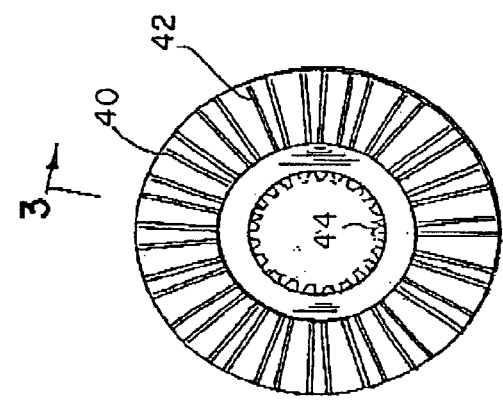
Figure 2:
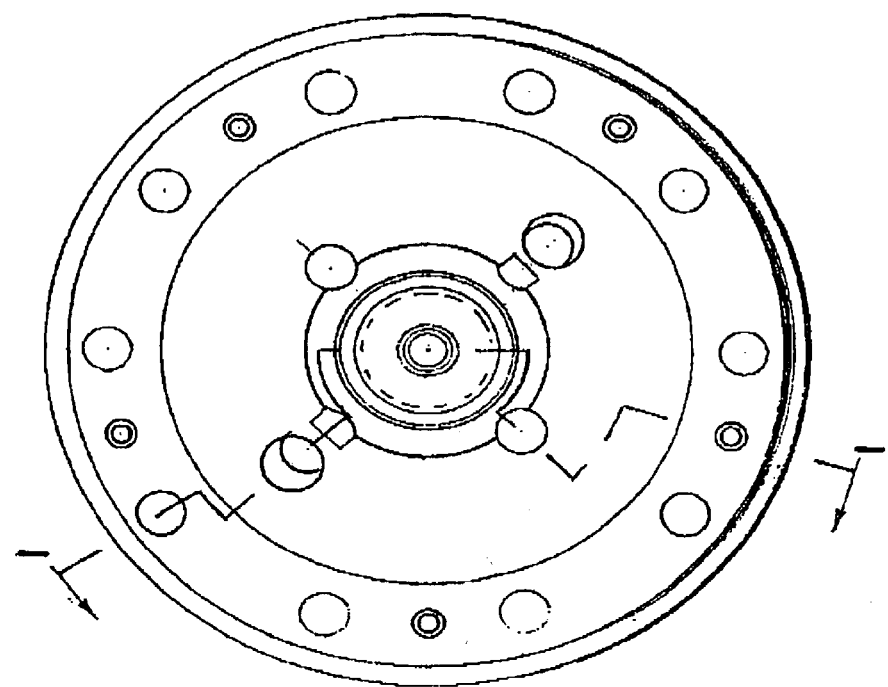
FIG. 2 is a left hand end view of the differential housing assembly of FIG. 1.

Referring to FIGS. 3–5, the left hand end of the locking gear 40 is stepped to define an annular first journal portion 40a that is journaled within a corresponding counterbore 16a formed in the first output shaft opening 16 contained in housing section 2a. At its right hand end, the locking gear 40 is provided with pinion teeth 42 that continuously engage corresponding pinion teeth on the center driver member 38. In the illustrated embodiment, the pinion teeth extend radially inwardly for engagement with corresponding cam teeth on the left hand end of the center cam member, thereby to lock the cam member 38 against rotation relative to the central driver gear 32. As shown in FIG. 5, the locking gear 40 is provided with a relatively large number (i.e., twenty) of pinion teeth each having a relatively shallow tooth depth, thereby to effect quicker engagement and disengagement of the pinion teeth, as is customary for racing car differentials. The locking gear includes internal splines 44 that non-rotatably connect the locking gear with the inside wheel shaft 20.

As is customary in the art, the right hand end of the side gear 24 is provided with an external annular flange portion 24a that supports the annular spring retainer 46. This flange portion 24a is spaced from the end extremity of the side gear to define a stepped annular extension that is journaled within a corresponding counterbore formed in the second output shaft opening 18.

In operation, assume that the racing car is traveling in a given direction around a closed circular or oval track, such that the driven shafts 20 and 22 are the inside and outside wheel shafts, respectively. On a straightaway portion of the track, the wheel shafts 20 and 22 are driven at the same speed from the vehicle drive shaft 8 via pinion gear 10, ring gear 12, central driver gear 32, and the locking gear 40 on the one hand, and via pinion gear 10, ring gear 12, central drive gear 32, and clutch member 28 and the side gear 24 on the other hand, respectively. When the racing car enters a turn, the overrunning clutch member 28 is cammed out and displaced to the right against the restoring biasing force of clutch spring 30 by the cooperation between the cam teeth on the center cam member 38 and the corresponding cam teeth on the clutch member 24. The outside wheel shaft 22 is thus placed in a disconnected free-wheeling condition as long as the rotational velocity of the outside wheel shaft exceeds that of the inside wheel shaft by a predetermined amount. Upon completion of the turn and the corresponding slowing down of the outside wheel shaft relative to the rotational velocity of the inside wheel shaft, the clutch member 28 is biased by spring 30 to the left to return the pinion teeth on the side gear into return engagement with the pinion teeth on the central driver member. Both wheel shafts are again driven at the same speed by the drive shaft 8.

Although the pinion teeth 42 on the locking gear 40 have been disclosed as being in engagement with both the pinion teeth on the center drive gear 32 and the cam teeth on the left hand end of the center cam member 38, it will be apparent that if the cam member is to be maintained free for rotation relative to the central driver member 32, the radially inwardly extending length of the pinion teeth 42 is reduced so that the inner ends of the pinion teeth terminate short of the cum teeth of the cam member 32.

Referring now to the second embodiment of the invention illustrated in FIGS. 6–9, the differential includes a holdout ring 100 for maintaining the overrunning clutch member 128 in the disengaged condition as long as the velocity of the outside wheel shaft 122 exceeds that of the inside wheel shaft 120 by a predetermined amount. As is known in the art, the holdout ring is a resilient split generally annular member that is biased radially inwardly into engagement with the annular slot 101 contained in the face of the overrunning clutch member 128. When an overrunning condition exists, the clutch member is displaced to the right by the cooperation between the cam teeth 150 on the clutch member 128 and the corresponding cam teeth on the center cam member 138. As the clutch member is angularly displaced relative to the center drive member 132, the holdout ring is similarly angularly displaced (owing to the frictional engagement between the holdout ring and the clutch member slot 101) to a position relative to the cam member as to maintain the clutch member in the disengaged condition, whereby the disturbing noise of teeth chatter is avoided. When the overrunning condition ceases, the holdout ring is slightly angularly displaced to a position that permits re-engagement of the clutch pinion teeth 142 with the corresponding teeth on the center driver gear.

In this embodiment, the number of pinion teeth on the clutch member 128 is reduced (i.e., to fifteen in the embodiment shown in FIG. 8), and the depth of the tooth is increased, as shown in FIG. 9, thereby providing a sturdy durable clutch member, together with the provision of adequate space for operating the holdout ring 150. Also provided in this embodiment are annular thrust washer means 152, 154 that support the shoulder portions formed at the remote ends of the locking gear 140 and the side gear 124, respectively.

Again, the inwardly directed length of the pinion teeth 142 could be reduced to permit free rotation of the center cam member 138 relative to the central drive member 132.

Referring now to the third embodiment of FIGS. 10–12, the locking gear 240 has an enlarged end portion 240a that is journaled in a corresponding counterbore 217 contained in the first outlet shaft opening 216 contained in the housing section 202a, and the side gear 224 has an enlarged end portion 224a that is journaled in the second output shaft opening defined in the housing section 202b. The enlarged end flange portion 224a of the side gear supports the annular spring retainer 246 for the clutch spring 230. This design accommodates axles fitted with larger bearings. Consequently, larger diameters for the side gear and the locking gear ends are required. The larger bearings and added case material increase torque and axial load capacity of the differential casing.

While in accordance with the provisions of the patent statutes the preferred forms and embodiments of the invention have been illustrated and described, it will be apparent to those skilled in the art that various changes and modifications may be made without deviating from the inventive concepts set forth above.

What is claimed is:

1. A locking differential mechanism having a drive shaft for driving a pair of wheels of a race car that travels in a given direction about a closed oval or circular track, whereby one driven wheel is always the outside wheel, and the other driven wheel is always the inside wheel, comprising:

(a) a housing adapted to be rotationally driven by the drive shaft about a given axis within a hollow differential casing, said housing containing a chamber having a pair of opposed end walls respectively containing first and second output shaft openings arranged collinearly relative to said housing axis of rotation and being adapted to receive the inside and outside driven wheel shafts of the race car, respectively;

(b) locking means for continuously connecting with said housing an inside wheel shaft that is inserted within said first output shaft opening; and (c) overrunning clutch means for normally connecting with said housing an outside wheel shaft that is inserted within said second output shaft opening, said overrunning clutch means being operable to disconnect the outside wheel shaft from said housing when the rotational velocity thereof exceeds that of the inside wheel shaft by a given amount, said overrunning clutch means including:

(1) an annular side gear rotatably mounted within said housing concentrically about said axis of rotation adjacent said second output shaft opening, said side gear being internally splined for non-rotational connection with a correspondingly splined end of the outside wheel shaft, a portion of said side gear also being externally splined;

(2) an internally splined annular clutch member mounted concentrically about and in axially displaceable splined connection with said side gear externally splined portion;

(3) an annular central driver gear non-rotatably mounted within said housing chamber concentrically about said housing axis of rotation intermediate said chamber end walls, said central driver gear having an end face provided with concentrically arranged pinion teeth positioned for engagement with corresponding pinion teeth arranged on the adjacent end face of said clutch member;

(4) clutch spring means biasing said clutch member axially toward said central drive gear, thereby to normally effect engagement between said pinion teeth on said clutch member and the corresponding pinion teeth on said central driver gear; and (5) means operable upon overrunning of the outside wheel shaft relative to the inside wheel shaft for displacing said clutch gear axially away from said central driver gear, thereby, to effect disengagement of said clutch member pinion teeth from said driver gear pinion teeth;

(d) said locking means comprising:

(1) an annular locking gear collinearly arranged within said housing chamber adjacent said first output shaft opening;

(2) said locking gear being internally splined for non-rotatable splined connection with the splined end of an inside wheel shaft that is inserted collinearly within said first housing opening;

(3) said locking gear having an end face adjacent said central driver gear that is provided with pinion teeth in continuos engagement with corresponding pinion teeth on the adjacent face of said central driver gear.

2. A differential as defined in claim 1, wherein the remote ends of said locking gear and said side gear are provided with stepped annular shoulder means adjacent and in engagement with said housing chamber end walls, respectively.

3. A differential as defined in claim 1, is wherein said cam means includes:

(1) an annular cam member arranged concentrically within and connected for rotation relative to said central driver member;

(2) said cam member having an end face adjacent a corresponding end face on said clutch member;

(3) said adjacent end faces of said cam member and said clutch member having cam teeth that cooperate when the outside wheel shaft overruns the inside wheel shaft to displace said clutch member axially away from said center driver member, thereby to disengage said pinion teeth on said clutch member from the corresponding pinion teeth on said central driver member.

4. A differential as defined in claim 3, wherein said cam member has an end face adjacent said locking member that is provided with cam teeth, said locking member pinion teeth being in continuous enmeshing engagement with the associated cam teeth.

5. A differential as defined in claim 3, and further including:

(e) holdout ring means for retaining said clutch member in said disengaged condition as long as the outside wheel shaft is in the overrunning condition relative to the inside wheel shaft.

6. A differential as defined in claim 5, wherein the remote ends of said locking gear and said side gear are provided with stepped annular shoulder means adjacent said housing chamber end walls, respectively.

7. A differential as defined in claim 6, and further including:

(f) first and second thrust washer means arranged between said shoulder means and the associated housing chamber end walls, respectively.

8. A differential as defined in claim 1, wherein said side gear includes an enlarged end flange portion in engagement with the bottom of a counterbored portion of said second housing output shaft opening.

9. A differential as defined in claim 8, wherein said locking gear has an enlarged end portion that engages the bottom of a counterbored portion of said first housing output shaft opening.

* * * * *